United States Patent [19]

Mantarro

[11] Patent Number: 4,598,000
[45] Date of Patent: Jul. 1, 1986

[54] SPRAY-SUPPRESSION DEVICE

[75] Inventor: Joseph Mantarro, Windsor, Conn.

[73] Assignee: Monsanto Company, St. Louis, Mo.

[21] Appl. No.: 738,917

[22] Filed: May 29, 1985

[51] Int. Cl.⁴ .............................................. B62D 25/16
[52] U.S. Cl. ..................................... 428/17; 428/286; 280/154.5 R
[58] Field of Search ................. 428/218, 284, 286, 17; 280/154.5 R

[56] References Cited
U.S. PATENT DOCUMENTS 4,329,196 5/1982 Rawlinson .......................... 156/243
4,391,870 7/1983 Ellis ..................................... 428/218

OTHER PUBLICATIONS

Modern Plastics Encyclopedia, 1983-1984, vol. 60, #10A, p. 60.

Primary Examiner—John E. Kittle
Assistant Examiner—Thomas C. Saitta
Attorney, Agent, or Firm—Thomas E. Kelley

[57] ABSTRACT

A device for reducing splash and spray thrown from vehicle wheels comprising a high density polyethylene substrate layer fusion-bonded to a three-dimensional layer comprises a plurality of balde-like elements extending from a base layer. To improve break resistance at low temperture the three-dimensional layer comprises linear low density polyethylene.

4 Claims, 3 Drawing Figures

SPRAY-SUPPRESSION DEVICE

BACKGROUND OF THE INVENTION

This invention relates to a device for reducing splash and spray thrown from the wheels of a vehicle moving on wet pavement. More particularly this invention relates to a laminated spray-suppression device of thermoplastic material having a three-dimensional molded surface.

As disclosed in U.S. Pat. No. 3,899,192, incorporated herein by reference, laminated spray-suppression devices for mounting to the rear of the wheels of a moving vehicle are known in the prior art. In that patent a grass-like layer is shown facing the rotating wheel and this has been proven especially effective in absorbing impinging spray from a wet roadway surface and allowing it to drain back onto the pavement.

While the splash and spray reducing device comprising such a three-dimensional laminate has found wide acceptance in the transportation industry, this device is not completely free of drawbacks. Materials normally used to form three-dimensional layer of this laminate, such as low density polyethylene (LDPE), typically have poor low temperature mechanical properties, particularly ductility and impact. Cracking and resultant failure of these three-dimensional laminates due to poor low temperature ductility and impact resistance is often exacerbated by the geometry of the three-dimensional layer. This three-dimensional layer typically comprises a base portion in the form of a series of parallel rows of ribs and a plurality of blade-like protrusions extending from cup-like bases located between the parallel rows of ribs clustered at the intersections. The intersecting points at which the cup-like bases and ribs are joined provide areas of high stress localization which can result in the development of localized cracks which can propagate through the thickness of the three-dimensional layer. While it might be suspected that the utilization of a substrate or backing layer made from material which has good low temperature properties, such as high density polyethylene, would compensate for the deficiencies of the three-dimensional layer and provide the laminate with acceptable ductility and impact resistance. It has been found that the three-dimensional laminates exhibit significant embrittlement related failure when used at low temperature conditions. The low temperature embrittlement of the LDPE three-dimensional layer causes the failure of the entire laminate at temperatures at which the substrate itself remains ductile. The failure of the entire laminate is believed to be due to cracks which initiate in the LDPE three-dimensional layer, as described above, and which propagate through the entire thickness of the laminate. Propagation across the interface between the ductile backing layer and the brittle LDPE three-dimensional layer occurs where the bonding process produces strong association of the two layers.

As disclosed in U.S. Pat. No. 4,361,606, irradiation of the composite overcomes the problem and provides the device having a three-dimensional layer of LDPE with the desired balance of low temperature properties. However, irradiation has its deficiencies. More specifically, rather high dosages are necessary to alleviate cracking and this represents significant expense. Moreover, such dose levels provide an undesirable yellow tinge to the laminated product, e.g. to the backing which is often desired to be white. In addition catalysis residues, e.g. free radicals, may be developed in the various layers of polyethylene by the irradiation and react over long term periods to cause deterioration in the very properties intended to be enhanced. An alternative solution to the problem is disclosed in U.S. Pat. No. 4,391,870 where an intervening layer of a nonwoven fabric core encapsulated on each side with an adhesive layer is located between the backing layer and the LDPE three-dimensional grass-like layer. Such encapsulated fabric core layer positioned between the backing layer and the LDPE three-dimensional grass-like layer serves to absorb and dissipate the energy of a crack as it is transmitted in low temperature service to such core layer from the embrittled LDPE layer thereby preventing the crack from propagating through to the backing layer. The use of such encapsulated fabric core layer however has its disadvantages. Specifically the use of such core layer requires additional material and manufacturing costs adversely effecting the economic viability of such spray-suppression devices.

SUMMARY OF THE INVENTION

By this invention applicant has provided a laminated spray-suppression device which overcomes the aforementioned deficiencies of the prior art.

Accordingly, a principle object of this invention is to provide a laminated spray-suppression device having a decreased tendency to crack through its thickness to low temperatures which does not rely on irradiation or the use of an encapsulated fabric core layer for its effectiveness.

Another object of this invention is to provide such a device which achieves low temperature effectiveness by the use of a grass-like, three-dimensional molded layer of thermoplastic material having substantially high ultimate elongation (as determined by ASTM D-638) at low temperatures. Preferably such thermoplastic material will exhibit an ultimate elongation of at least about 400 percent at about minus 30° C.

These and other objects of the invention are accomplished by providing a laminated spray-suppression device comprising a substrate of high density polyethylene fusion bonded to a grass-like, three-dimensional molded layer of linear low density polyethylene (LLDPE).

PREFERRED EMBODIMENTS

The laminated spray-suppression device of this invention comprises a substrate layer and a three-dimensional grass-like LLDPE layer which are selected to provide structural support and dimensional stability to allow for satisfactory spray-suppression performance over the expected range of ambient conditions, for instance at temperatures well below 0° C., e.g. −30° C. or lower and at temperatures higher than about 50° C.

Figure 3:
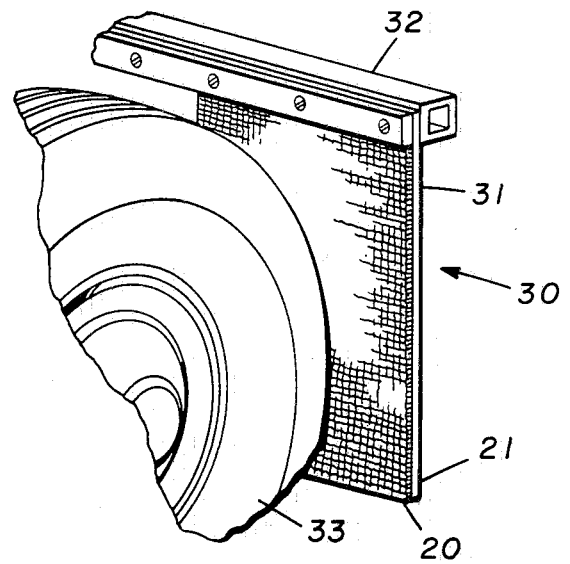
FIG. 3 illustrates a spray-suppression device according to this invention mounted in its operative position behind a wheel, e.g. of a truck.

The spray-suppression device of this invention is typically mounted as a conventional flap with the grass-like layer facing a vehicle wheel. In such arrangement, as illustrated in FIG. 3, the spray-suppression device 30 is rigidly secured along its upper edge 31 to a portion of the vehicle, e.g. a bracket 32, rearward of a vehicle wheel 33 and the device is free to flex around the securement points. During vehicle travel the device is submitted to continual flexure conditions and primarily to wind pressure from the forward movement of the vehicle. In normal operation this wind pressure results in flexure of the device such that the grass-like layer 20 is in tension whereas the substrate layer 21 is in compression. Such flexure should be inhibited as much as possible to present an adequate amount of grass-like layer surface for absorbing impinging spray thrown by the wheel. Such flexure is inhibited by selecting a substrate layer having acceptable mechanical strength properties over most driving temperature conditions. To provide such properties the substrate layer can advantageously comprise high density polyolefin, e.g. high density polyethylene (HDPE) or high density polypropylene. Preferably the substrate layer comprises HDPE having a density in the range of from about 0.945 to about 0.960, and preferably in the range of from about 0.95 to 0.96. Such preferred HDPE will also have a melt index in the range of from about 0.1 to about 0.95, preferably in the range of from about 0.2 to 0.4. Control of flexure will depend on the thickness of the substrate layer which may range from about 2 to about 10 millimeters, depending on the other overall dimensions, i.e. length and width, of the spray-suppression device which will vary to accommodate the vehicle wheel size. For spray-suppression devices designed to be installed behind tandem wheels of a truck, thicknesses in the range of 3 to 8 millimeters have proved to be satisfactory.

Figure 2:
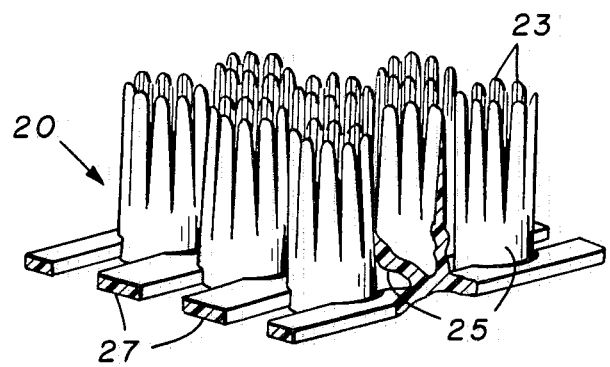

The laminated spray-suppression device of this invention also comprises a grass-like, three-dimensional molded layer of LLDPE which provides a collection surface for impinging water thrown from the vehicle wheels. The LLDPE grass-like, three-dimensional molded layer of the laminated spray-suppression device of this invention will generally comprise a plurality of elongated blade-like elements extending from a base layer. One geometric shape for such three-dimensional layer, well-known in the art, is described by Doleman, et al. in U.S. Pat. Nos. 3,590,109 and 3,507,010 both of which are incorporated herein by reference. As illustrated in FIG. 2, the three-dimensional layer 20 disclosed by Doleman, et al. has a plurality of upstanding, randomly-oriented, blade-like elements 23 extending from cup-like bases 25 integrally molded to and located between parallel rows of rib-like elements 27 in the base layer.

Figure 1:
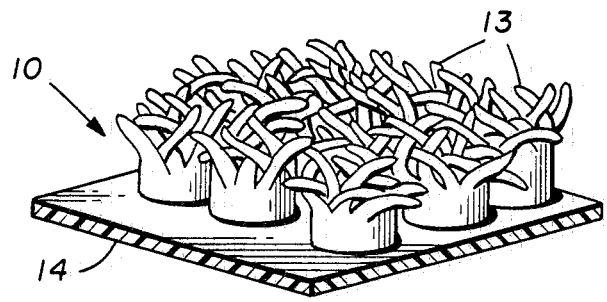
FIGS. 1 and 2 illustrate embodiments of grass-like, three-dimensional layers useful in the spray-suppression devices of this invention.

As illustrated in FIG. 1, an alternative three-dimensional layer comprises a plurality of elongated projections 13 (preferably, blade-like) extending from a base layer which is substantially uniform sheet 14. Such three-dimensional layer can be produced by continuous injection molding apparatus and processes as disclosed in commonly-owned, copending application Ser. No. 738,804, filed May 29, 1985 incoporated herein by reference.

The blade-like elements can be substantially randomly-entangled as illustrated in FIG. 1 or substantially straight-up as illustrated in FIG 2, regardless of whether the base layer is ribbed or ribless.

The LLDPE three-dimensional layer can comprise any LLDPE exhibiting substantially high elongation as measured by ASTM D-638 at low temperature. Preferably, such LLDPE will exhibit elongation at about minus 30° C. of at least about 400 percent or higher, e.g. at least about 500 percent. Such LLDPE is distinguished from the various LDPE polymers which generally exhibit elongation at about minus 30° C. of only up to about 100 percent, and often as low as 10 percent.

Such three-dimensional layers of LLDPE can be applied to a backing layer, e.g. of HDPE, by methods disclosed by Rawlinson in U.S. Pat. No. 4,329,196, incorporated herein by reference. Preferably, the three-dimensional layer of LLDPE can be applied to a backing layer by methods disclosed in commonly-owned, copending application Ser. No. 738,803 filed May 29, 1985, incorporated herein by reference.

The spray-suppression devices of this invention can be evaluated for low temperature durability by two tests: (1) a bend-to-break test and (2) an impact resistance test.

The bend-to-break test is performed on full size spray-suppression device which in its most common form comprises a 61 cm (24 inch) by 76 cm (30 inch) section of laminated product and representing the size of a conventional truck rain flap. The laminated product is conditioned for 24 hours at about −30° C. (about −20° F.) the conditioned laminated product is tightly clamped along a 61 cm (24 inch) side between a pair of jaws of a device which includes a confining track into which the 76 cm (30 inch) sides of the product are fitted which allows the product to be moved horizontally but not vertically. The jaws are then rotated angularly downward from the horizontal by means of a conventional drive mechanism through a maximum of 180 degrees at a rate of about 14 degrees per second. This places the upper face of the product (the three-dimensional grass-like surface) under tension and the lower face (the thick substrate) in compression. If cracking through the full thickness of the bending product occurs a clutch mechanism deactivates the drive mechanism and the traversed angle of rotation from the horizontal is read from an adjacent scale to provide the maximum angle through which the test specimen was capable of bending before breakage occurs at a temperature on the order of about −30° C. (about −20° F.).

The impact resistance test measures the energy required to crack test specimens under specified conditions of impact using a fixed weight, variable height falling tup. The technique used is commonly called the Bruceton Staircase Method and involves a combination of portions of ASTM D1709, part 36; D2444, part 26 and D3029, part 35. The procedure establishes the height which will cause 50 percent of the specimens tested to fail using a constant tup weight. According to the method the tup is repositioned after each impact to the next higher or lower increment depending upon the response from the previous specimen. Increments are 15.24 cm (½ foot) units from 15.24 to 229 cms (½ to 7½ feet) total. This will result ideally in half of the specimens passing and half failing. The average height at which this occurs when expressed as the product of the tup weight is termed the 50 percent pass/fail value. The impact resistance is the energy in fotot pounds required to produce 50 percent failures and is determined for any given sample as the product of the mean drop height times the tup weight. Failure is signified by the presence of any crack or split created by the impact of the falling tup which can be seen by the naked eye. At least 20 specimens 12.7 cm (5 by 5 inches) are taken from a 61 cm (24 inch) by 76 cm (30 inch) laminated product section. Specimens are conditioned at −30° C. (about −20° F.) for at least 16 hours prior to testing. The test procedure involves presetting the tup to the estimated 50 percent pass/fail height, placing the specimen over the sample holder and releasing the tup to allow it to free fall to impact. If impact does not result in catastrophic failure, the specimen is closely examined for evidence of any crack or split. If the specimen passes, the tup is reset to the next higher increment whereas if it fails, the tup is reset at the next lower increment. If the tup is at maximum or minimum height, its weight is adjusted as necessary to reestablish a practical working range. If weight adjustment cannot be made the specimen is recorded as pass or fail.

The use of LLDPE three-dimensional layers in the spray-suppression devices of this invention provides exceptional low temperature durability not found in devices of the prior art. If greater durability is desired, e.g. because of use in extremely low temperature environments or extremely severe impact service, the durability can be further enhanced by providing a break resistant intervening layer between the grass-like layer and the substrate. As disclosed in U.S. Pat. No. 4,391,870, incoporated herein by reference, such intervening layer can comprise a non-woven fabric core layer encapsulated on each side with an adhesive layer. A preferred intervening layer is a non-woven polyamide fabric core layer encapsulated on each side with an adhesive of a copolymer of ethylene and vinyl acetate.

EXAMPLE

The following example illustrates the advantageously low temperature properties of spray-suppression devices of this invention as compared to spray-suppression devices of the prior art.

PRIOR ART DEVICE

A spray-suppression device (herein designated PRIOR ART DEVICE) was prepared by laminating, e.g. fusion bonding, a LDPE grass-like, three-dimensional layer as described by Doelman, et al. in U.S. Pat. No. 3,590,109 to a HDPE substrate. The grass-like layer had a plurality of blade-like elements extending in groups of eight (8) from cup-like bases integrally molded between parallel rows of ribs. The HDPE substrate had a thickness of about 4.8 mm (0.19 inches).

SPRAY-SUPPRESSION DEVICE A

A spray-suppression device according to this invention (herein designated SPRAY SUPPRESSION DEVICE A) was prepared by fusion bonding a LLDPE grass-like, three-dimensional layer having a structure similar to the PRIOR ART DEVICE to a HDPE substrate having a thickness of about 4.8 mm.

SPRAY SUPPRESSION DEVICE B

A spray-suppression device according to this invention (herein designated as SPRAY-SUPPRESSION DEVICE B) was prepared by fusion bonding a LLDPE grass-like, three-dimensional layer having a structure similar to the PRIOR ART DEVICE to a HDPE substrate having a thickness of about 4.8 mm. The grass-like layer comprised a plurality of blade-like elements extending in groups of eight (8) from cup-like bases arranged on a substantially uniform (ribless) sheet.

The results of low temperature property tests for the three types of spray-suppression devices described above are set forth in Table 1.

TABLE 1

COMPARISON OF LOW TEMPERATURE DURABILITY OF SPRAY-SUPPRESSION DEVICES

| | Low Temperature Durability Test | |
|---|---|---|
| | Bend to Break | Impact Resistance |
| Prior Art Device | 35 degrees | 20 joules (15 ft-lbs) |
| Spray-Suppression Device A | >180 degrees | 80 joules (60 ft-lbs) |
| Spray-Suppression Device B | >180 degrees | 120 joules (90 ft-lbs) |

The results of low temperature property tests set forth in Table 1 clearly illustrate the superior low temperature properties achieved with spray-suppression devices fabricated with a grass-like layer of LLDPE.

The preceding description is set forth for purposes of illustration only and is not to be taken in a limited sense. Various modifications and alterations will be readily suggested to persons skilled in the art. It is intended, therefore, that the foregoing be considered as exemplary and that the scope of the invention be ascertained from the following claims.

We claim:

1. A laminated spray-suppression device comprising a substrate layer of high density polyethylene fusion bonded to a grass-like, three-dimensional layer having a plurality of elongated blades extending from a base layer, which is a substantially uniform sheet; said three-dimensional layer comprising linear low density polyethylene.

2. The device of claim 1 further comprising a non-woven fabric core layer intermediate the substrate layer and the grass-like, three-dimensional layer; wherein the fabric core layer is encapsulated on each side with an adhesive layer.

3. A laminated spray-suppression device comprising a substrate layer of high density polyethylene fusion bonded to a grass-like, three-dimensional layer of linear low density polyethylene having a plurality of blade-like elements extending from cup-like bases integrally molded to and located between parallel rows of rib-like elements.

4. The device of claim 3 further comprising a non-woven fabric core layer intermediate the substrate layer and the grass-like, three-dimensional layer; wherein the fabric core layer is encapsulated on each side with an adhesive layer.

* * * * *